United States Patent Office 2,755,236
Patented July 17, 1956

2,755,236

CATALYST

Preston Robinson, Williamstown, Mass., assignor to Sprague Electric Company, North Adams, Mass., a corporation of Massachusetts No Drawing. Application June 15, 1953,
Serial No. 361,835

5 Claims. (Cl. 204—10)

The present invention relates to a new and improved type of catalyst.

It is an object of this disclosure to teach the production of catalysts which, because of their extremely high surface area, are extremely effective for use with a variety of reactions. Further objects of the invention, as well as the advantages of it will be apparent from the balance of this specification, as well as the appended claims.

Briefly, the new catalysts of the invention are prepared by sintering together at least one bivalent oxide selected from the group consisting of nickel oxide, cobalt oxide, and iron oxide and at least one alkali metal oxide of the group consisting of lithium oxide, cesium oxide, potassium oxide, rubidium oxide, and sodium oxide, slowly cooling the resultant sintered material, and reducing the mixture in an electrolytic bath so as to produce a finely divided metal catalyst composed of a metal selected from the group consisting of nickel, cobalt, and iron.

Obviously, mixtures of the above oxides can also be used in preparing the new materials of the instant invention, but because of the differences in reduction potentials in an electrolytic solution, such mixtures are not, as a rule, preferred. By virtue of the above procedure, it is possible to produce catalyst materials which possess an extremely large effective surface area enabling them to be substituted for well known catalysts, such as Raney nickel. The new catalysts of the invention are, as a rule, much more effective than the prior art catalysts of the same category in a number of reactions, such as, for example, hydrogenation or the like. Because of their high reactivity, they must be kept at all times under non-oxidizing conditions, preferably in a liquid bath.

In producing the new catalysts of the invention, it is in general preferred to admix together approximately equi-molar parts of bivalent oxides of materials from the iron group; that is, nickel, cobalt, or iron, and oxides selected from the group consisting of lithium oxide, cesium oxide, potassium oxide, rubidium oxide, and sodium oxide, although a departure of up to about 25% from equi-molar parts may be made without materially affecting the properties of the final product obtained. The actual admixture of the ingredients may be carried out in any way convenient to the art. Frequently, the several oxides are ground together in a ball mill together with a small quantity of an inert suspending liquid, such as, for example, a partially polymerized polyvinyl alcohol mixture. Because of the relatively high reactivity of the second group of oxides, care should be taken to exclude as much water as possible during the mixing step. In general, the finer the particles ground together, the larger the effective surface area of the final catalyst produced. The largeness of particles can in part, of course, be overcome by the solid state expedient of repeated sintering and grinding, but for practical purposes, such repeated sintering and grinding is not desired. In general, optimum results are obtained if the particles as finely admixed together possess an average particle size of less than about 325 mesh.

The mixture of the individual oxides once formed is pressed into a coherent pellet for the use of appropriate pressures in the range of from about 100 to 5,000 p. s. i. gauge with or without the use of separate binder materials. Suitable binders are polyvinyl alcohol, gum tragacanth, potato starch, or the like. Although the greater the percentage of binder material used with the invention, the greater the conductivity of the sintered pellet because of the reducing tendency of the binder it is preferred not to use over about 10% by weight of binder calculated on the basis of the final pellet weight in order to produce a sintered product which does not have too high a percentage of voids. At times, a liquid vehicle used during a previous grinding step, such as for example, the polyvinyl alcohol mentioned above, can serve quite satisfactorily as a binder in the formation of a suitable compressed pellet. When such materials are used, a small amount of heat and/or catalysts sufficient to set up the suspending liquid are preferably employed during the pellet formation.

The so-produced pellet is next fired at a temperature of from about 600° C. to about 1450° C. for a period sufficient to diffuse the monovalent ions present within the composition in the crystalline lattice of the divalent oxide so as to produce a compact sintered structure of reasonably high conductivity. Obviously, this reaction is a time-temperature one. At the lower temperature mentioned, periods of about 24 hours normally produce satisfactory results. At the other end of the temperature range, satisfactory diffusions of the ions will occur within a period of approximately one hour. The atmosphere employed during the sintering step can be inert in characteristics, however, improved results are obtained when it is of at least a mild reducing nature, because when this is the case, there is a certain amount of reduction of the metallic ions to small practically undetectable particles of metal which materially aid in improving the conductance of the final sintered pellet.

Because of the inherent tendency of the divalent iron cobalt and nickel oxides, to decompose yielding a mixed oxide and small metal particles which cannot be readily detected by microscopic detection when cooled slowly, the sintered pellets produced as described in the preceding paragraph are preferably cooled at a rate not to exceed about 10° per minute in the range of temperatures of from 600° C. to about 100° C. Above this temperature, the cooling may be carried out more rapidly. The cooling atmosphere is preferably regulated in such a manner that there is no tendency for the crystalline structure to take up oxygen which may have been stripped off during the reaction by virtue of the heat employed and/or the reducing atmosphere which may have been used. The pressed pellet should not be quenched in water, as when this is done, the conductance of the final sintered pellet is apt to suffer to a material extent.

Once created, the pellet produced as described above is reduced into the final highly effective catalyst by being attached to an inert cathode in an electrolytic bath. The actual composition of the electrolyte employed for this purpose can vary extremely widely. In general, any non-oxidizing liquid composition of reasonable conductivity can be employed. Some suitable compositions for use as electrolytes are the following aqueous solutions: 3-molar ferrous sulphate, 4-molar sulphuric acid, 2-molar hydrochloric acid, 4-molar sodium chloride, or the like. The electrolyte used does not presently appear to be critical. The precise voltages and current densities, as well as the temperatures employed during the reduction will depend upon the specific sintered oxide structure being treated. In general, voltages of from about 60 volts to about 400 volts with current densities of from about 5 to about 40 amps per square centimeter at temperatures from 50° C.

to the boiling point of the electrolyte employed are satisfactory. The specific metal pellets described herein, of course, decompose within the electrolyte employed. The catalysts produced by this decomposition may be separated from the bulk of this material by simple decantation procedures and any residual electrolyte left within them can be removed by repeated washing and decantation. During all of these steps, care must be taken that the highly reactive catalyst compositions are not allowed to dry out, and further, do not come in contact with ingredients which might tend to oxidize the catalyst.

Those skilled in the art will realize that the herein described and disclosed invention is capable of wide modification within the broad scope of this disclosure. All such modifications of the invention are to be considered part of it insofar as they are defined by the appended claims. In order that this disclosure may be complete under the rules of practice of the U. S. Patent Office, the following specific examples are listed.

*Example 1*

Equi-molar proportions of nickel oxide and lithium oxide, were ground together in a ball mill for a period of 48 hours. At that time, all of the particles within the mixture were passed through a 325 mesh screen. This mixture was then pressed into a compact pellet about 2 inches in diameter and 1 inch thick by the use of 2,000 p. s. i. pressure. The so-pressed pellet was fired at 1400° C. for 4 hours in a nitrogen atmosphere. At the end of this time, it was cooled in the same atmosphere at the rate of 10° C. per minute down to 100° C. when it was further cooled by quenching in air. This pellet was placed within an electrolytic bath in which the electrolyte consisted of a 2-molar aqueous solution of sulphuric acid by being attached to a metallic strip serving as the cathode of the unit. It was then reduced using a current density of 30 amps per square centimeter of over-all cathode area at a voltage of 300 volts until only a porous powder at the bottom of the electrolyte remained of the original pellet. This powder was separated by decantation, and washed twice with water. It served as a highly effective catalyst.

*Example 2*

The same procedure as indicated in Example 1 above was followed using equi-molar parts of cobalt oxide and cesium oxide. The mixture here was fired at 1200° C. in an atmosphere consisting of 80% by volume of nitrogen and the balance hydrogen.

*Example 3*

Ferrous oxide particles passing through a 325 mesh screen were admixed with particles of approximately the same size of potassium oxide in an inert atmosphere in approximately equi-molar proportions. The resultant mixture was pressed under the same inert atmosphere into a thin wafer approximately ⅛ inch thick, 2 inches long, and 1 inch wide. This wafer was fired at 1,000° C. in an atmosphere consisting of 4 parts nitrogen and 1 part methane (parts by volume) for a period of 8 hours.

At the end of this time the pellet was taken and cooled in the same atmosphere at a rate of approximately 60° C. per minute down to a temperature of 600° C. From this point down to room temperature, it was cooled at the rate of 10° C. per minute. The so-sintered pellet was then attached to a platinum cathode and placed in an electrolytic bath in which the electrolyte consisted of a 4-molar solution of sodium chloride in water and was then reduced using a voltage of 400 volts and a current density of 40 amps. per square centimeter. A finely divided blackish powder was produced by this step which was separated and washed as in Example 1.

*Example 4*

Equi-molar parts of divalent nickel oxide and sodium oxide were treated as described in Example 3 above except that the mixture was sintered at 900° C. for a period of 18 hours, and was further reduced to current densities of 20 amps. per square centimeter.

*Example 5*

Equi-molar parts of ferrous oxide and rubidium oxide were treated as in Example 4 above.

What is claimed is:

1. A process of producing a new and improved metallic catalyst which comprises admixing at least one divalent metallic oxide selected from the group consisting of nickel oxide, cobalt oxide, and iron oxide with at least one alkali metal oxide selected from the group consisting of sodium oxide, lithium oxide, rubidium oxide, cesium oxide, and potassium oxide, the amounts of alkali metal and divalent oxides being so chosen that at least 25 mol percent of each oxide is present in the mixture forming a compressed mass from said mixture, sintering said compressed mass at an elevated temperature so as to diffuse the alkali metal ions of said mixture into the crystalline structure of said divalent oxide, slowly cooling said compressed mass, and reducing the so-cooled product as the cathode in an electrolytic bath.

2. A process as defined in claim 1 above wherein said sintering is carried out in an inert atmosphere.

3. A process as defined in claim 1 above wherein said sintering is carried out in a reducing atmosphere.

4. A process as defined in claim 1 above wherein said sintering is carried out within the temperature range of from about 600° C. to about 1450° C., and wherein said sintered product is cooled within the temperature range of from 600° C. to 100° C. at a rate not to exceed about 10° C. per minute.

5. The process of claim 1, wherein equimolar amounts of the alkali metal and divalent oxides are utilized.

References Cited in the file of this patent

UNITED STATES PATENTS

| | | |
|---|---|---|
| 1,299,565 | Ellis | Apr. 8, 1919 |
| 1,844,925 | Kohler | Feb. 9, 1932 |
| 2,106,597 | Ferguson | Jan. 25, 1938 |
| 2,136,509 | Jenness | Nov. 15, 1938 |
| 2,567,296 | Milligan et al. | Sept. 11, 1951 |